US012790178B2

(12) United States Patent
Canteli Alvarez et al.

(10) Patent No.: US 12,790,178 B2
(45) Date of Patent: Nov. 10, 2026

(54) METHOD TO PREDICT FAULTS IN A PASSENGER MOVING SYSTEM

(71) Applicant: TK Escalator Norte S.A., Mieres (ES)

(72) Inventors: Francisco Canteli Alvarez, Gijon (ES); Ignacio Muslera Fernandez, Gijon (ES)

(73) Assignee: TK Escalator Norte S.A., Mieres (ES)

( * ) Notice: Subject to any disclaimer, the term of this patent is extended or adjusted under 35 U.S.C. 154(b) by 1033 days.

(21) Appl. No.: 17/754,760

(22) PCT Filed: Oct. 14, 2020

(86) PCT No.: PCT/EP2020/078930
§ 371 (c)(1),
(2) Date: Apr. 11, 2022

(87) PCT Pub. No.: WO2021/074236
PCT Pub. Date: Apr. 22, 2021

(65) Prior Publication Data

US 2024/0017966 A1 Jan. 18, 2024

(30) Foreign Application Priority Data

Oct. 15, 2019 (EP) .................................... 19382901

(51) Int. Cl.
*B66B 25/00* (2006.01)
*B66B 5/00* (2006.01)

(52) U.S. Cl.
CPC .......... *B66B 25/006* (2013.01); *B66B 5/0025* (2013.01)

(58) Field of Classification Search
CPC ............................ B66B 5/0025; B66B 25/006
See application file for complete search history.

(56) References Cited

U.S. PATENT DOCUMENTS 6,112,166 A * 8/2000 Joosten .................... B66B 27/00 702/185
6,325,179 B1 * 12/2001 Barreiro ................ B66B 5/0037 187/393

(Continued)

FOREIGN PATENT DOCUMENTS

CN 101486431 A 7/2009
CN 101570302 A 11/2009

(Continued)

OTHER PUBLICATIONS

International Search Report and Written Opinion in International Patent Application No. PCT/EP2020/078930, mailed on Feb. 11, 2021.

*Primary Examiner* — Rina I Duda
(74) *Attorney, Agent, or Firm* — Dinsmore & Shohl LLP

(57) ABSTRACT

A method of predicting deterioration in a brake system of a passenger moving system includes, placing at least one sensor within the passenger moving system such that the sensor is in communication with at least one of a main shaft of the passenger moving system, at least one movable panel of the passenger moving system, a motor of the passenger moving system, a control unit of the passenger moving system, or a gateway device. The method also includes activating the at least one sensor, performing data acquisition each time the passenger moving system is stopped, refining the acquired data, calculating a stopping distance of the passenger moving system, repeating the performing and refining steps over a specified time period, and triggering a command signal initiating a maintenance operation in response to the calculated stopping distance reaching a pre-determined threshold.

21 Claims, 3 Drawing Sheets

(56) References Cited

U.S. PATENT DOCUMENTS

| | | | | |
|---|---|---|---|---|
| 7,527,127 | B2 * | 5/2009 | Osterman | B66B 5/0031 187/361 |
| 7,827,127 | B2 * | 11/2010 | Wolf | G06F 9/5038 706/14 |
| 8,997,968 | B2 * | 4/2015 | Braasch | B66B 25/006 198/322 |
| 9,856,111 | B1 * | 1/2018 | Anderson | B66B 11/0407 |
| 2006/0144646 | A1 * | 7/2006 | Engel | B66B 5/0087 187/391 |
| 2017/0355560 | A1 * | 12/2017 | Herkel | B66D 5/30 |
| 2018/0029839 | A1 * | 2/2018 | Chen | G01P 3/38 |
| 2018/0029841 | A1 * | 2/2018 | Li | B66B 21/02 |
| 2018/0029842 | A1 * | 2/2018 | Li | B66B 29/06 |
| 2018/0032598 | A1 | 2/2018 | Senger et al. | |
| 2018/0282122 | A1 | 10/2018 | Sudi et al. | |

FOREIGN PATENT DOCUMENTS

| | | | |
|---|---|---|---|
| CN | 108689268 | A | 10/2018 |
| EP | 3235771 | A1 | 10/2017 |
| JP | H06284634 | A | 10/1994 |
| JP | 2005219843 | A | 8/2005 |

* cited by examiner

METHOD TO PREDICT FAULTS IN A PASSENGER MOVING SYSTEM

CROSS REFERENCE TO RELATED APPLICATIONS

This application is a U.S. National Stage Entry of International Patent Application Serial Number PCT/EP2020/, filed May 29, 2019, which claims priority to both of German Patent Application No. DE 10 2018 211 492.7, filed Jul. 11, 2018, and to European Patent Application No. EP 18382372.3, filed May 30, 2018, the entire contents of each of which are incorporated herein by reference.

FIELD

The invention refers to a method of predicting deterioration in a brake system comprised within a passenger moving system and use of said method in a passenger moving system.

BACKGROUND

Passenger moving systems including escalators, moving walks and elevators are stopped at various times for various reasons during their lifetime. Once a "stop" signal has been registered, the moving panels of an escalator or moving walk or the cabin of the elevator, experience first a reduction in speed before coming to a halt. During this stopping process, vibrations and friction between the moving components occur. At the beginning of a moving system's lifetime, a "stop" command can be affected within a short space of time and the corresponding stopping distance covers the shortest distance. This distance is normally measured in millimeters (mm). Over time however, due to everyday "wear and tear" on the moving system, this stopping distance gradually increases and continues to increase until it reaches a point where safety is compromised. All moving systems comprise a control unit that is configured to shut down a moving system in the event this stopping distance becomes too large and no longer complies with safety requirements, for example, the code or regulation EN115, B44.

Current methods of monitoring the health of passenger moving systems and ensuring they comply with safety regulations include a technician manually reviewing all parts of the system during a routine maintenance check. In this particular case, the technician would be manually reviewing the brake shoes of the escalator or moving walk or elevator.

Some passenger moving systems comprise display units that communicate to the technician the nature of the fault. Some systems comprise no such display unit, leaving the technician to perform a full check-up of the passenger moving system in order to deduce where the fault lies. Regardless of whether there is a display or not, this process is time consuming for the technician, expensive for the customer and causes significance inconvenience to passengers because the passenger moving system has to rendered "out of order".

EP 3363758 A1 discloses a mechanism for monitoring the operation of a passenger transport device. U.S. Pat. No. 5,785,165 discloses a data collection and analysis system for passenger conveyors. However, neither of these documents address the problem of faults in the braking system directly, nor do they address the problem of being able to predict a fault in the braking system before it occurs. Furthermore, no two passenger moving systems are the same, which means a prediction for a first system would not necessarily be the same for a second system.

In general, braking detection systems with sensors are known for escalators as passenger moving systems, which are disclosed in US 2018/0029839 A1 and US 2018/0032598 A1. For this purpose the braking detection systems comprise sensors which are arranged above the escalator and detect the braking distance of the escalator with imaging sensors and/or with depth sensing sensors. However, this detection system is problematic if, for example, there are many people or obstacles on the braking escalator or if, for example, plant branches grow between the sensors and the braking escalator to be detected, so that the actual mechanical components whose braking distance is to be detected are no longer recognizable by the sensors. In this case, the proposed detection cannot take place according to the state of the art.

Thus, there is a need to mitigate these problems in order to save time for the technician;

money for the owner of the passenger moving system; and aggravation for the passengers.

DETAILED DESCRIPTION

Figure 1:
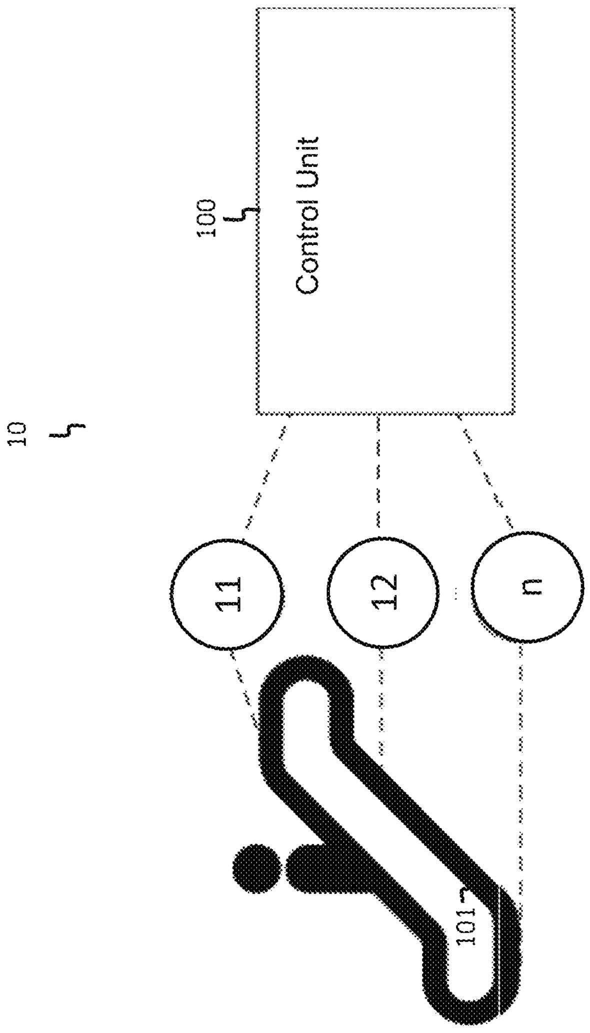
FIG. 1 shows a schematic diagram of a passenger moving system implementing a method of FIG. 2 according to an embodiment of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention refers to a method of predicting deterioration in a brake system comprised within a passenger moving system. Passenger moving systems preferably include escalators, elevators, and moving walks. The method preferably comprises the method steps of;

a. placing one or more sensor within the system such that it is in communication with any one or more of:
   - a main shaft of the passenger moving system;
   - at least one movable panel of the passenger moving system, wherein the at least one movable panel preferably comprises a pallet of a moving walkway, a step of an escalator, or a panel of an elevator cabin;
   - a motor of the passenger moving system;

a control unit of the passenger moving system a gateway device, for example an internet of things (IoT) device, e.g. a cloud.

Placing the one or more sensor within the system means that the one or more sensor is physically integrated into the passenger moving system, which is for example an elevator, an escalator or a moving walk. In other words, the one or more sensor is enclosed by the passenger moving system. This allows to monitor values in different places inside the passenger moving system, which also means that there is no need for an unobstructed view between an external sensor and the system. The integrated arrangement of each sensor allows a much more flexible application. Thus, the passenger moving system can be equipped with sensors independent of its environment. For example, no external lighting is necessary. Likewise, it is not relevant for the detection capability of the sensors whether many people are standing on the escalator, for example. This is due to the fact that the detection takes place from the inside and not remotely from above on the exemplary escalator. Furthermore, the design of the passenger moving system can be made more harmonious without visible sensors. The sensors can also be manufactured more cheaply, since they do not need to be insulated against external environmental influences as much as completely external sensors. Furthermore, they can be manufactured more cheaply, since they require a smaller detection spectrum than remote sensors, for example those that detect from above. At the same time, the aforementioned feature can reduce the degree of detection inaccuracies. The above mentioned advantages apply individually or all together to all passenger moving systems. If escalators are mentioned, this only applies as an example.

The one or multiple sensor(s) is/are preferably in communication with the control unit via a wireless connection or via hardware. The control unit is preferably in communication with a cloud via a wireless connection or hardware.

b. activating the one or more sensor. This is achieved each time the at least one moving panel passes by the at least one sensor during its transit; or several times per revolution of the motor; or several times per revolution of the main shaft.

Preferably one or more sensor is adapted to respond to a change in motion of the passenger moving system The sensor(s) preferably constantly measure speed. Data acquisition begins when the movable panel(s) begin to stop. At this point, the stopping distance is measured over a pre-defined time interval, until the movable panel(s) come to a complete stop. Preferred sensors include magnetic sensors, inductive sensors, optical sensors, capacitance sensors, encoder sensors, e.g., rotary encoders. Optical sensors are particularly laser sensors, whereby especially such optical sensors without external light supply are preferred. For example, it is possible to use only one or more inductive sensors, which has proven to be particularly precise.

These sensors can detect independently of any illumination, even in complete darkness, so that the interior of the passenger moving system does not need to be illuminated. The passenger moving system is preferably stopped for example via, a safety switch, a mechanical switch, a button, or any other stopping mechanism known in the art. Activation of any one of these stopping mechanisms will activate the at least one sensor.

c. performing data acquisition, i.e., collecting data, each time the passenger moving system is stopped. The collection of data starts as soon as the movable panels start to slow down and continues until the passenger moving system comes to a stop.

d. refining the acquired or collected data, preferably by applying one or more of a pre-determined filter, wherein said filter is at least one selected from the group comprising:

when the escalator was started in the wrong direction and had to stop to start again in the desired direction;

the moving system is stopped due to technical maintenance;

in the case of a supermarket passenger moving system, when it is running at full capacity and there is no free space on the moving panels. This represents an exceptional occurrence and would cause an anomaly in the average stopping distance calculation.

Any stopping caused by at least one of these events is regarded as "abnormal";

e. running the refined collected data through an algorithm to calculate a stopping distance in millimeters (mm). Stopping distances and the code of regulation pertaining thereto can vary between different brands of escalators.

Preferably the method steps c. to d. are repeated over a specified time period. The specified time period preferably refers to a number of hours, a number of days, a number of weeks or a number of months. Preferably the period of time covers at least a month having up to 31 days so that a comparison of data "from month-to-month" is possible.

A command signal initiating a maintenance operation is triggered when the calculated stopping distance reaches a pre-determined threshold or when the variation from one value to a value in similar conditions but in a previous time interval has reached the pre-determined threshold.

When the stopping distance reaches and/or exceeds a pre-determined threshold, the control unit is adapted to block the passenger moving system, i.e., it will cause it to shut down until the necessary maintenance work is carried out. This threshold is determined according to the code of regulations for the specific passenger moving system. The relevant code of regulations for escalators for example would be EN115/B44. This advantageously provides a method tailored to the safety requirements of the specific passenger moving system wherein the method allows for a monitoring of the excessive stopping distance and predicts when a fault in the brake system is near.

A maintenance operation preferably includes informing the relevant party, e.g., the customer; a building services manager; a technician that the brake of e.g. the escalator needs to be inspected and/or the subsequent repair or replacement thereof. This can for example take the form of displaying an error code on a display unit comprised within the passenger moving system. This advantageously avoids the risk of exceeding the excessive stopping distance and thus avoids an automatic shut-down of the passenger moving system.

This method can be carried out over a specified time period, preferably constantly over a specified time period. The method can be adapted to acquire data at pre-defined time intervals over this time period. For example, the method can be performed:

over a number of months, wherein the data is acquired during e.g., every second or third day; or over a number of months, wherein data is acquired e.g. during every 5 hours; or over a number of months, wherein data is acquired e.g. during every 1 to 5 minutes.

The specified time period and the pre-defined time intervals over said time period can vary between minutes, hours, days and months. This optimizes maintenance efficiency and increases the operational lifespan of the moving system.

Preferably, a filter operation is applied after step (e) to determine any trend in the stopping distance. This advantageously ensures that only useful data is taken into consideration and any "abnormal" data is prevented from skewing results and negatively affecting the excessive stopping distance.

Preferably, the pre-determined threshold is set according to a code of regulation pertaining to the specific type of passenger moving system. This advantageously provides for a "tailor-made" method that can be applied to any type of passenger moving system. Table 1 and table 2 provide details from the code of regulation EN115 relating to excessive stopping distances for escalators and moving walks respectively.

TABLE 1 stopping distances for escalators

| Nominal speed v | Stopping distance between |
|---|---|
| 0.5 m/s | 0.20 m and 1.00 m |
| 0.65 m/s | 0.30 m and 1.30 m |
| 0.75 m/s | 0.4. m and 1.50 m |

TABLE 2 stopping distances for moving walks

| Nominal speed v | Stopping distance between |
|---|---|
| 0.5 m/s | 0.20 m and 1.00 m |
| 0.65 m/s | 0.30 m and 1.30 m |
| 0.75 m/s | 0.4. m and 1.50 m |
| 0.90 m | 0.5 m and 1.70 m |

Preferably, the specified time period is one selected from the group comprising:

any number of months between 1 to 50 months,
any number of months between 2 to 36 months,
any number of months between 2 to 24 months
any number of months between 2 to 12 months.

Preferably the pre-defined time intervals for acquiring data within the specified time period can be any one selected from the group comprising:

every minute; every second minute; every n minute;
every hour; every second hour; every n hour;
every day; every second day; every n day.

This advantageously allows for flexibility within the method.

The invention relates to a use of the method as outlined above in a passenger moving system.

Preferably the passenger moving system is selected from the group comprising:

an elevator;
an escalator;
a moving walk.

FIG. 1 shows a schematic diagram of a passenger moving system 10 implementing a method 100 according to an embodiment of the invention. In this particular example, the moving walkway 10 is an escalator wherein the escalator comprises a control unit 100 and at least one movable panel 101. The control unit 100 is in communication with a gateway device (not shown), for example, a computer or portable laptop wherein e.g., the computer is equipped with the required software to communicate with the control unit 100 allowing for the condition of the escalator 10 to be constantly monitored. Only one sensor is required to carry out this method, however in this example, three are shown. A first sensor 11 is positioned such that it measures the movement of at least one movable panel 101 about the exit of the escalator 10. A second sensor 12 is positioned such that it measures the movement of at least one movable panel 101 about the middle of the escalator 10 and a third sensor n is positioned such that it measures the movement of at least one movable panel 101 about the entrance of the escalator 10. The sensors 11, 12, n used in this particular example are magnetic sensors. It is also possible to position the one or more sensor in the motor (not shown) or in the main shaft (not shown) so that said sensor(s) can sense any starting and stopping. The sensors 11, 12, n are activated each time the relevant moving panel 101 passes by the sensor 11, 12, n during the looped transit. When the moving panels begin to stop, data acquisition begins and the stopping distance is continuously measured until the panels come to a complete stop. An analysis of the stopping operation, in particular the excessive stopping distance is performed at the control unit 100 thereby providing a forecast on the condition of the brake system (not shown). This analysis involves the method outlined in steps 101 to 110.

Steps 101 to 103 are performed at the control unit 100 of the passenger moving system. Step 101 requires the gathering of data relating to the stopping distance each time the moving walkway 10 is stopped. Step 101 is initiated upon activation of at least one sensor 11, 12, n. Step 102 involves calculating the corresponding stopping distance. This information is then transmitted to an interface module in step 103. In this particular example, the interface module is an internet of things (IoT) device, e.g., a cloud. The calculated distance(s) is/are pre-processed in step 104, this involves basic filtering of data. The pre-processed data is then sent to a database in step 105. The database can be comprised of hardware e.g., a USB, or be located in a cloud. The control unit 100 is adapted to send this information to the database in order to perform data analysis and processing.

Once at the database, processing is carried out in step 106 allowing the data to be filtered in step 107. Filtering involves removing outliers in order to take into account the behavior, normal or otherwise of the escalator 10. This includes for example, removing any stopping data which was recorded when the unit was travelling at a speed different to the nominal speed, or when the stopping data was recorded when the escalator 10 was stopped "abnormally", e.g., it started in the wrong travelling direction and was immediately stopped before having reached its nominal speed; or
the emergency stop was triggered; or
technical maintenance was carried out; or
the escalator 10 is running at full capacity, i.e., there is no space for any more passengers to travel on it.

In such exceptional situations, the stopping distance will be abnormal and thus not a true reflection of a braking operation under normal conditions. If the escalator is stopped for travelling in the wrong direction, the stopping distance will be small due to the slow speed achieved by the escalator in that short space of time. If the escalator is moving at a higher speed and the emergency brake is triggered, the stopping distance will be larger. Should any of these situations arise, the escalator will stop in the normal way, however the corresponding data readings are described as "abnormal" and are thus preferably discounted during processing. A variation of several mm or less, e.g., (2 to 20 mm) in the stopping distance over a time period of e.g. one week is considered as "normal". During the monitoring of the stopping distance over a specified time period, e.g., 31 days, a constant increase in stopping distance is expected due to increased wear on the brake. The data is then analyzed in step 108.

Analysis 108 can include

- taking into account the resolution of the signal that generates points with minimum variation. This depends on the amount of data saved in the database. A reduction in resolution makes it easier to filter the results;
- selecting the maximum or minimum values for the data associated with a specific period of time. The nature of the selected values can vary between the maximum and minimum if desired;
- analyzing the selected values to find a trend in order to detect a consistency in the stopping distance;
- additionally, or alternatively to the preceding point, cross-checking an absolute value obtained with the pre-determined threshold value. The threshold value can vary depending on the unit type and nominal speed according to the relevant code of regulation e.g., EN115/B44.

Once analysis is complete, a result is obtained in step 109. When the stopping distance has reached the pre-determined threshold, or when the variation from one value to a value in similar conditions but in a previous time interval has reached the pre-determined threshold, an alert will be generated in step 110 to inform the relevant party, e.g., the customer; a building services manager; a technician, that the brake of the escalator 10 needs to be inspected and where necessary, repaired, replaced or adjusted.

Figure 2:
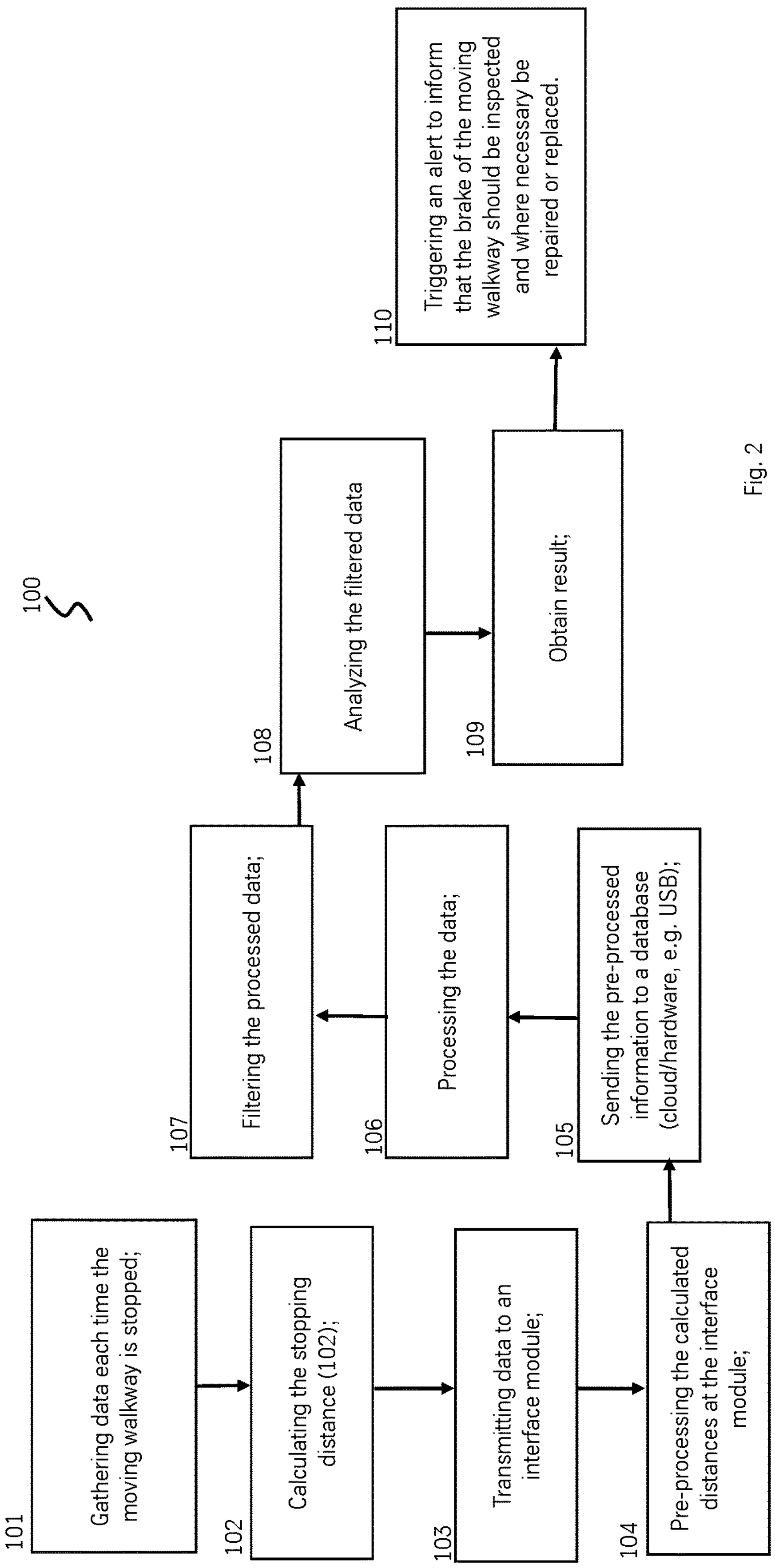
FIG. 2 shows a flow chart depicting steps of the method of the present disclosure.

FIG. 2 shows a flow diagram of the method steps as outlined in FIG. 1.

Figure 3:
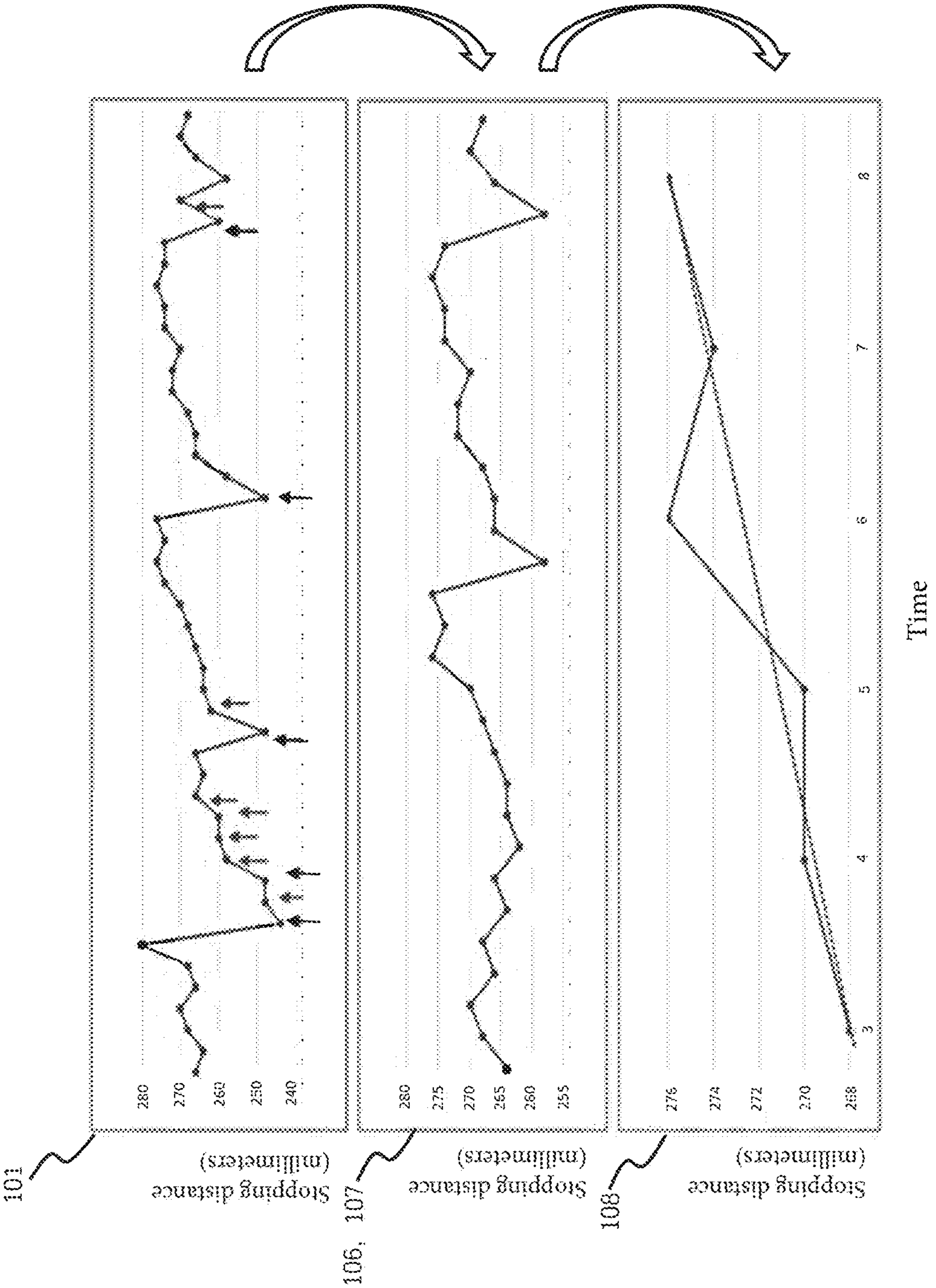
FIG. 3 shows a schematic graphical representation of selected method steps of FIG. 2 according to an embodiment of the present disclosure.

FIG. 3 shows the difference in the recorded data before and after analysis between steps 101 and 108. The top graph corresponds to step 101 wherein data points are recorded for each day. The x-axis represents the time each time the escalator stops. There can be several points recorded per day. The y-axis details the stopping distance in millimeters, which runs from 240 mm to 280 mm.

The middle graph shows the recorded data after having been filtered in step 107. The data points in the first graph which have an arrow depict "abnormal" readings and are discounted in the filtering step thus reducing the number of total data points. The middle graph has an x-axis detailing the dates, and a y-axis detailing the stopping distance in millimeters, which runs from 255 mm to 280 mm.

The bottom graph shows the recorded data after a final analysis is carried out in step 108 and provides a result (step 109). An average data point is recorded to represent the reading over a particular week. The x-axis details the "number of weeks", in this particular example, the time period is 6 weeks. The y-axis details the stopping distance in millimeters, which now runs from 268 mm to 276 mm. If, in this particular example the pre-determined threshold for the stopping distance was 280 mm, no alert would be triggered since the maximum stopping distance recorded was 276 mm. Thus the escalator 10 would be allowed to continue to operate as normal. If however, the pre-determined threshold value was 275 mm or 276 mm, the highest recorded value of 276 mm reaches or surpasses this threshold, thus an alert signal is generated to initiate a maintenance operation i.e., inform the relevant party, e.g., the customer; a building services manager; a technician, that the brake of the escalator 10 needs to be inspected and where necessary, repaired, replaced or adjusted. If the data is processed in the cloud, the alert signal can be triggered at any step within the method as shown in FIG. 2. The control unit 100 sends the measurements of the stopping distance based on the sensor 11, 12, n inputs to the cloud.

REFERENCE SIGNS LIST

10 passenger moving system
11 sensor
12 sensor
n sensor
101 moving panel
100 method step
101 method step
102 method step
103 method step
104 method step
105 method step
106 method step
107 method step
108 method step
109 method step
110 method step

What is claimed is:

1. A method of predicting deterioration in a brake system of a passenger moving system, comprising:

- placing at least one sensor within the passenger moving system such that the at least one sensor is enclosed by the passenger moving system, the at least one such that said sensor is in communication with at least one of:
- a main shaft of the passenger moving system,
- at least one movable panel of the passenger moving system,
- a motor of the passenger moving system,
- a control unit of the passenger moving system, or
- a gateway device;
- activating the at least one sensor;
- performing data acquisition each time the passenger moving system is stopped, wherein the performing data acquisition begins when movable panels of the passenger moving system start to slow down and continues until the passenger moving system comes to a stop such that a stopping distance is measured over a pre-defined time interval from the start to slow down until the passenger moving system comes to the stop;
- refining the acquired data;
- calculating a stopping distance of the passenger moving system;
- repeating the performing and refining steps over a specified time period; and
- triggering a command signal initiating a maintenance operation in response to the calculated stopping distance reaching a pre-determined threshold.

2. The method of claim 1, wherein the at least one sensor is one or more of a magnetic sensor, an inductive sensor, an optical sensor, a capacitance sensor, and an encoder sensor.

3. The method of claim 1, further comprising:

- applying a filter operation after said calculating step to determine any trend in the stopping distance.

4. The method of claim 1, wherein the pre-determined threshold is set according to a code of regulation pertaining to said passenger moving system.

5. The method of claim 1, wherein the specified time period is a number of months between 1 month and 50 months.

6. The method of claim 1, wherein the pre-determined threshold is determined according to the code of regulations for the specific passenger moving system.

7. The method of claim 6, wherein the passenger moving system is an escalator and that the code of regulations for escalators is EN115/B44, so that the pre-determined threshold can be derived from this code of regulations.

8. The method of claim 1, wherein the passenger moving system is one of an elevator, an escalator, or a moving walkway.

9. The method of claim 1, wherein the refining of the acquired data is by filtering the acquired data.

10. The method of claim 9, wherein the filtering is performed when the passenger moving system is started in a wrong direction and had to stop to start again in a desired direction.

11. The method of claim 9, wherein the or more of a pre-determined filter is preformed when the passenger moving system is stopped due to technical maintenance.

12. The method of claim 9, wherein filtering is performed when the passenger moving system is running at full capacity and there is no free space on the moving panels.

13. The method of claim 9, further comprising:

running the refined acquired data through an algorithm to calculate the stopping distance in millimeters.

14. The method of claim 1, wherein the triggering of the command signal initiating the maintenance operation in response to the calculated stopping distance reaching the pre-determined threshold further inhibits movement of the passenger moving system.

15. A method of predicting deterioration in a brake system of a passenger moving system, comprising:

placing at least one sensor within the passenger moving system such that the at least one sensor is enclosed by the passenger moving system, the at least one such that said sensor is in communication with at least one of:

a main shaft of the passenger moving system, at least one movable panel of the passenger moving system, a motor of the passenger moving system, a control unit of the passenger moving system, or a gateway device;

activating the at least one sensor;

performing data acquisition each time the passenger moving system is stopped during normal operating conditions of the passenger moving system, wherein the performing data acquisition begins when movable panels of the passenger moving system start to slow down and continues until the passenger moving system comes to a stop;

refining the acquired data;

calculating a stopping distance of the passenger moving system;

repeating the performing and refining steps over a specified time period; and triggering a command signal initiating a maintenance operation in response to the calculated stopping distance reaching a pre-determined threshold.

16. The method of claim 15, wherein the at least one sensor is one or more of a magnetic sensor, an inductive sensor, an optical sensor, a capacitance sensor, and an encoder sensor.

17. The method of claim 15, further comprising:

applying a filter operation after said calculating step to determine any trend in the stopping distance.

18. The method of claim 15, wherein the pre-determined threshold is set according to a code of regulation pertaining to said passenger moving system.

19. The method of claim 15, wherein the pre-determined threshold is determined according to the code of regulations for the specific passenger moving system.

20. The method of claim 19, wherein the passenger moving system is an escalator and that the code of regulations for escalators is EN115/B44, so that the pre-determined threshold can be derived from this code of regulations.

21. The method of claim 15, wherein the passenger moving system is one of an elevator, an escalator, or a moving walkway.

* * * * *